United States Patent
Guo et al.

(10) Patent No.: US 8,934,186 B1
(45) Date of Patent: Jan. 13, 2015

(54) DATA STORAGE DEVICE ESTIMATING SERVO ZONE TO REDUCE SIZE OF TRACK ADDRESS

(71) Applicant: Western Digital Technologies, Inc., Irvine, CA (US)

(72) Inventors: Wei Guo, Fremont, CA (US); Michael Chang, San Jose, CA (US); Russ A. Quisenberry, San Jose, CA (US); Richard K. Wong, San Jose, CA (US); Guoxiao Guo, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/255,647

(22) Filed: Apr. 17, 2014

Related U.S. Application Data

(60) Provisional application No. 61/970,727, filed on Mar. 26, 2014.

(51) Int. Cl.
*G11B 5/09* (2006.01)

(52) U.S. Cl.
USPC ............................................. 360/48; 360/49

(58) Field of Classification Search
None
See application file for complete search history.

(56) References Cited

U.S. PATENT DOCUMENTS

| | | | |
|---|---|---|---|
| 4,424,543 A * | 1/1984 | Lewis et al. | 360/135 |
| 5,339,207 A * | 8/1994 | Moon et al. | 360/77.05 |
| 5,459,623 A * | 10/1995 | Blagaila et al. | 360/77.08 |
| 5,589,998 A * | 12/1996 | Yu | 360/78.14 |
| 5,771,126 A | 6/1998 | Choi | |
| 5,825,579 A | 10/1998 | Cheung et al. | |
| 5,940,240 A | 8/1999 | Kupferman | |
| 6,002,541 A | 12/1999 | Belser et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,075,667 A | 6/2000 | Kisaka et al. | |
| 6,078,453 A | 6/2000 | Dziallo et al. | |
| 6,091,564 A | 7/2000 | Codilian et al. | |
| 6,091,567 A | 7/2000 | Cooper et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,118,603 A * | 9/2000 | Wilson et al. | 360/48 |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,233,106 B1 | 5/2001 | Chambers | |
| 6,243,223 B1 | 6/2001 | Elliott et al. | |
| 6,281,652 B1 | 8/2001 | Ryan et al. | |
| 6,285,521 B1 | 9/2001 | Hussein | |

(Continued)

*Primary Examiner* — Paul Huber

(57) ABSTRACT

A data storage device is disclosed comprising a head actuated over a disk comprising a plurality of servo sectors defining a plurality of servo tracks. The servo tracks form a plurality of servo zones, and at least one servo sector of a servo track comprises a partial track address. A read signal generated by the head is processed to detect a current servo zone for the head, and the read signal is processed to detect the partial track address in one of the servo sectors of the current servo zone. A full track address is generated based on the detected servo zone and the detected partial track address.

12 Claims, 3 Drawing Sheets

(56) References Cited

U.S. PATENT DOCUMENTS

| | | |
|---|---|---|
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,345,021 B1 * | 2/2002 | Belser et al. ............... 369/47.1 |
| 6,347,018 B1 | 2/2002 | Kadlec et al. |
| 6,369,971 B1 | 4/2002 | Everett |
| 6,369,972 B1 | 4/2002 | Codilian et al. |
| 6,369,974 B1 | 4/2002 | Asgari et al. |
| 6,429,995 B1 | 8/2002 | Dobbek et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,608,477 B2 | 8/2003 | Sacks et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,775,081 B2 | 8/2004 | Ottesen et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,798,606 B2 | 9/2004 | Tang et al. |
| 6,819,518 B1 | 11/2004 | Melkote et al. |
| 6,826,006 B1 | 11/2004 | Melkote et al. |
| 6,826,007 B1 | 11/2004 | Patton, III |
| 6,831,808 B2 | 12/2004 | Ottesen et al. |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,083 B2 | 5/2006 | Ehrlich |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,405,893 B2 | 7/2008 | Bi et al. |
| 7,433,143 B1 | 10/2008 | Ying et al. |
| 7,440,210 B1 | 10/2008 | Lee |

(56) References Cited

U.S. PATENT DOCUMENTS

| | | |
|---|---|---|
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,859,778 B1 | 12/2010 | Vikramaditya et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,625,216 B2 | 1/2014 | Zhang et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

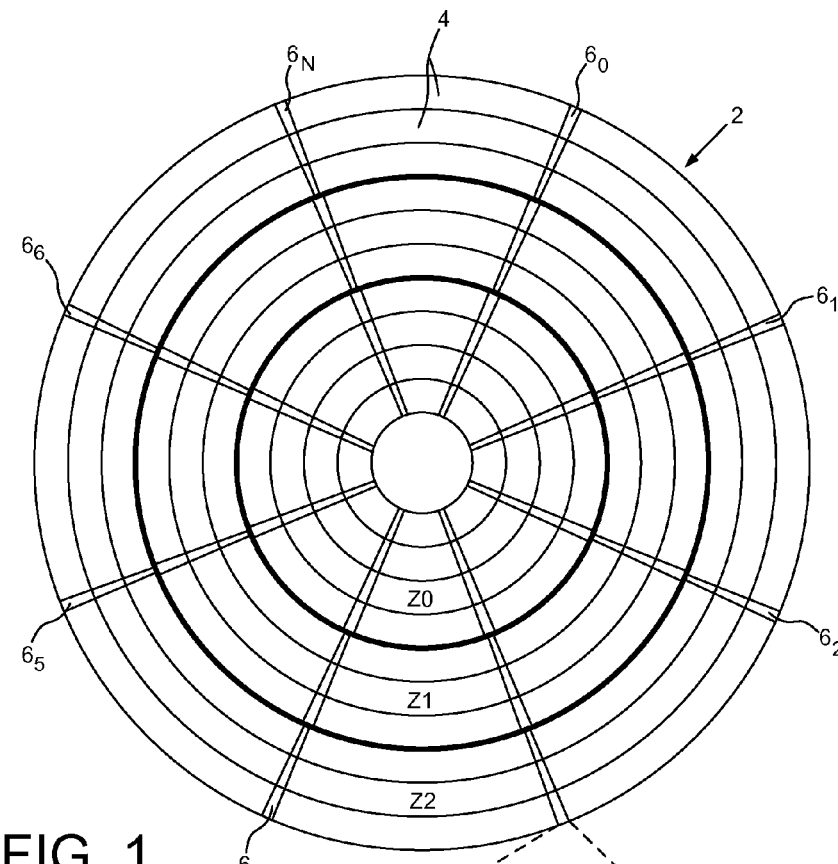
FIG. 1
(Prior Art)
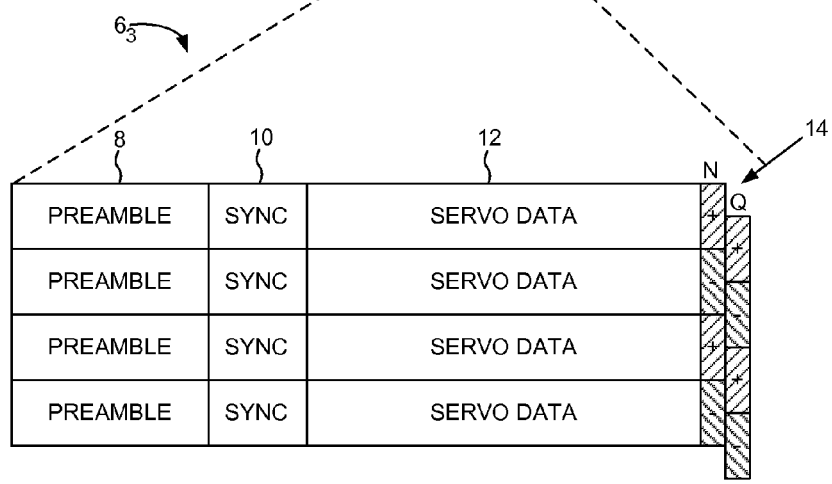

DATA STORAGE DEVICE ESTIMATING SERVO ZONE TO REDUCE SIZE OF TRACK ADDRESS

CROSS-REFERENCE TO RELATED APPLICATIONS

The present application claims priority from provisional U.S. Patent Application Ser. No. 61/970,727, filed on Mar. 26, 2014, the specification of which is incorporated herein by reference.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Because the disk is rotated at a constant angular velocity, the user data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the user data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (Z0) to the outer diameter of the disk (Z2).

The prior art disk format of FIG. 1 also comprises a number of servo sectors $6_0$-$6_N$ recorded around the circumference of the disk 2 that define a plurality of servo tracks, wherein the data tracks 4 are defined relative to the servo tracks at the same or different radial density. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES. In the prior art disk format of FIG. 1, the data rate of the servo sectors $6_0$-$6_N$ changes in each physical zone similar to the data sectors in order to improve format efficiency.

BRIEF DESCRIPTION OF THE DRAWINGS

FIG. 1 shows a prior art disk format comprising a plurality of servo tracks defined by servo sectors, wherein data tracks are defined relative to the servo sectors.

DETAILED DESCRIPTION

Figure 2A:
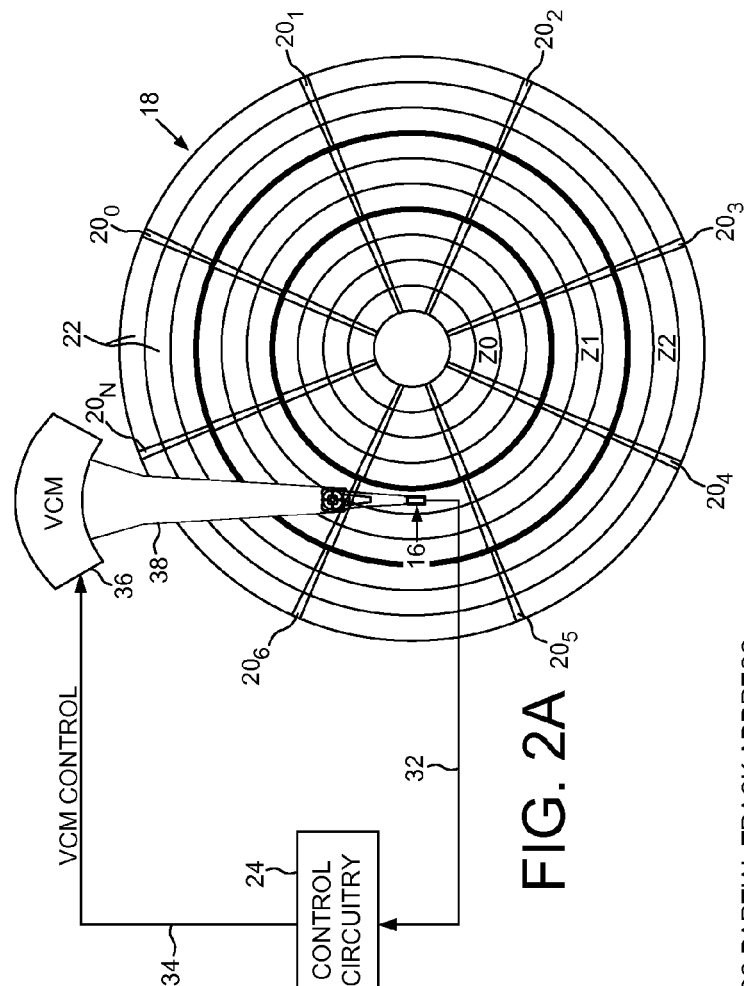
FIG. 2A shows a data storage device in the form of a disk drive according to an embodiment comprising a head actuated over a disk comprising a plurality of servo zones.
Figure 2B:
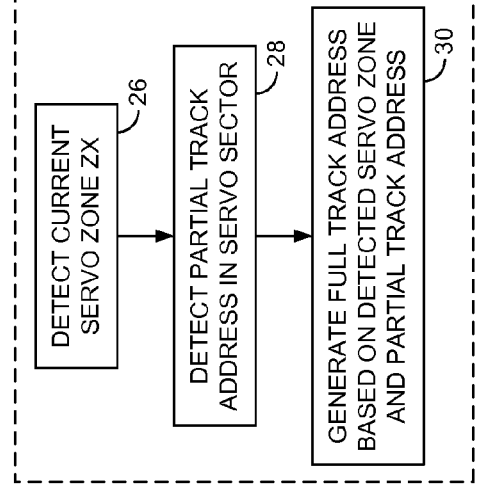
FIG. 2B is a flow diagram according to an embodiment wherein a full track address is generated based on a detected servo zone the head is over and a partial track address detected in a servo sector of the servo zone.

FIG. 2A shows a data storage device in the form of a disk drive according to an embodiment comprising a head 16 actuated over a disk 18 comprising a plurality of servo sectors $20_0$-$20_N$ defining a plurality of servo tracks 22. The servo tracks 22 form a plurality of servo zones (e.g., servo zone Z0, Z1, Z2), and at least one servo sector of a servo track comprises a partial track address. The disk drive further comprises control circuitry 24 configured to execute the flow diagram of FIG. 2B, wherein a read signal generated by the head 16 is processed to detect a current servo zone for the head (block 26), and the read signal is processed to detect the partial track address in one of the servo sectors of the current servo zone (block 28). A full track address is generated based on the detected servo zone and the detected partial track address (block 30). In the embodiment of FIG. 2A, the control circuitry 24 processes a read signal 32 emanating from the head 16 to demodulate the servo sectors $20_0$-$20_N$ that define the servo tracks 22. A position error signal (PES) is generated representing an error between the actual position of the head and a target position relative to a target track. A servo control system in the control circuitry 24 filters the PES using a suitable compensation filter to generate a control signal 34 applied to a voice coil motor (VCM) 36 which rotates an actuator arm 38 about a pivot in order to actuate the head 16 radially over the disk 18 in a direction that reduces the PES. The servo sectors $20_0$-$20_N$ may comprise any suitable head position information, including a partial track address for coarse positioning and servo bursts for fine positioning. The servo bursts may comprise any suitable pattern, such as an amplitude based servo pattern or a phase based servo pattern (FIG. 1).

Figure 2C:
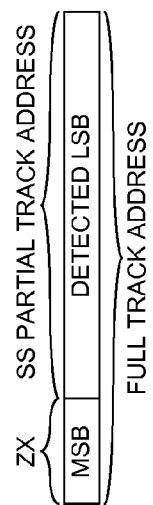
FIG. 2C shows an embodiment wherein the detected servo zone represents at least one high order bit of the full track address and the partial track address represents a plurality of low order bits of the full track address.

In one embodiment in order to improve the format efficiency of the disk 18, the size of each servo sector 20, is reduced by recording only a partial track address therein, wherein in an embodiment shown in FIG. 2C, the partial track address represents a plurality of low order bits of the full track address. At least one of the high order bits of the full track address is generated based on the current servo zone the head 16 is over. For example, if the disk 18 comprises eight servo zones then the detected servo zone may represent the two high order bits of the full track address. This improves the format efficiency since it reduces the size of each servo sector by these high order bits (e.g., by two bits in the above example).

The control circuitry 24 may detect the current servo zone the head 16 is over in any suitable manner. In one embodiment illustrated in FIG. 2A, a servo data rate of servo sectors in a first servo zone is different than a servo data rate of servo sectors in a second servo zone, and the control circuitry 24 is configured to detect the current servo zone for the head 16 based on a detected data rate of the servo sectors. For example, in one embodiment the data rate of the servo sectors may be increased from the inner diameter servo zone toward the outer diameter servo zone in order to achieve a more constant linear bit density. Within each servo zone the data rate of the servo sectors remains constant, and therefore the servo sectors form servo wedges within each servo zone as shown in FIG. 2A. The data rate of the servo sectors may be detected in any suitable manner, such as by searching for the servo sync mark using a suitable timing recovery circuit, and then evaluating a control signal in the timing recovery circuit (e.g., a phase-locked loop control signal) to estimate the data rate of the current servo zone. In another embodiment, after detecting the servo sync mark the data rate of the servo preamble may be detected using a suitable frequency detector operating on the signal samples that precede the detected servo sync mark.

Figure 3:
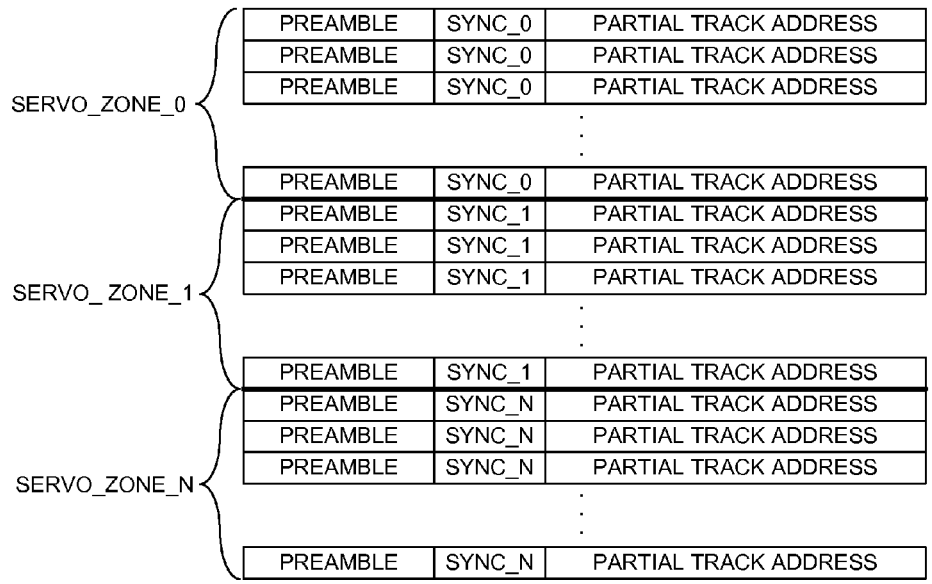
FIG. 3 shows an embodiment wherein each servo zone comprises a unique sync mark recorded in the servo sectors, and the current servo zone the head is over is detected based on the detected sync mark.

FIG. 3 shows an embodiment wherein at least one servo sector in each servo zone comprises a sync mark (a pattern of bits) that is unique to the servo zone. The control circuitry 24 may then detect the current servo zone the head is over based on the detected sync mark. That is, the control circuitry 24 may search for the sync mark based on the current radial location of the head 16 using any suitable timing recovery circuitry as described above. The signal samples may be processed with a bank of sync mark detectors (e.g., correlators) each configured to detect a sync mark in a corresponding servo zone. When one of the sync mark detectors successfully detects a sync mark, the control circuitry 24 may preliminarily detect the corresponding servo zone. The control circuitry 24 may then confirm the accuracy of the detected sync mark by configuring a servo gate window and detecting the sync mark in a following servo sector. If the sync mark is not detected, it is assumed the previous sync mark detection was a false positive and the search for the sync mark may be restarted.

Figure 4A:
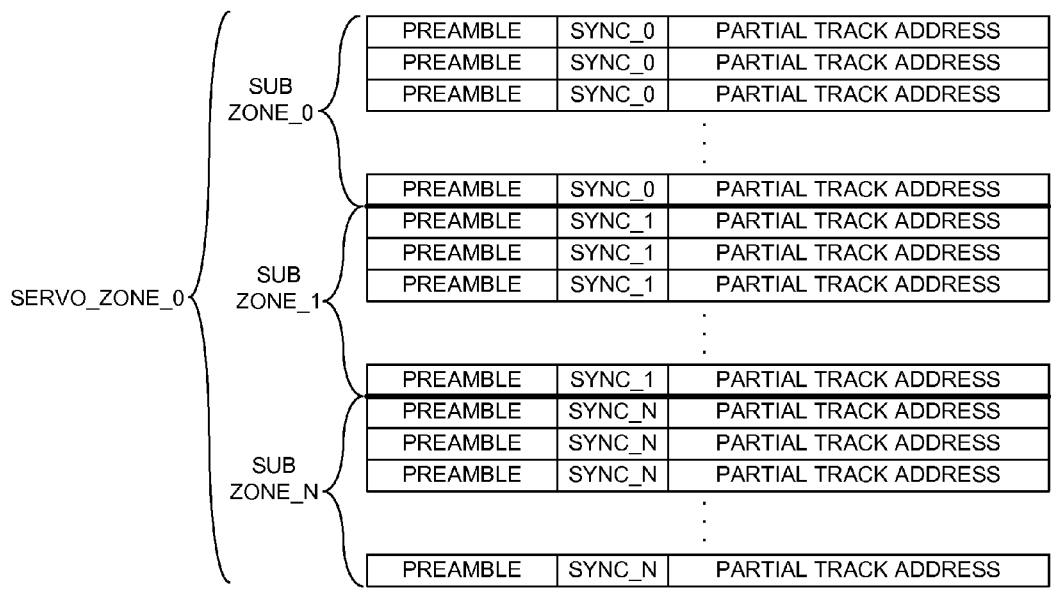
FIG. 4A shows an embodiment wherein unique sync marks are used to identify sub-zones within each servo zone, and each servo zone comprises servo sectors recorded at a unique data rate.
Figure 4B:
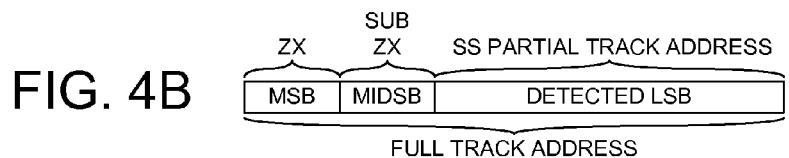
FIG. 4B shows an embodiment wherein the detected servo zone represents at least one high order bit of the full track address, the detected sync mark (sub-zone) represents at least one middle order bit of the full track address, and the detected partial track address represents a plurality of lower order bits of the full track address.

FIG. 4A shows an embodiment wherein the servo sectors in each servo zone are recorded with a unique data rate as described above with reference to FIG. 2A, and each servo zone is further divided into sub zones identified by a unique sync mark. FIG. 4A shows a single servo zone (SERVO_ZONE_0) comprising N+1 sub zones, where each sub zone comprises a plurality of the servo tracks, and at least one servo sector in each sub zone comprises a unique sync mark. In one embodiment shown in FIG. 4B, the partial track address represents a plurality of low order bits of the full track address, the detected sync mark represents at least one middle order bit of the full track address, and the detected servo zone represents at least one high order bit of the full track address. This embodiment further improves the format efficiency by further decreasing the number of bits stored in the track address field of each servo sector. For example, if the disk 18 comprises eight servo zones and each servo zone comprises eight sub zones, the size of each servo sector may be reduced by four bits (by reducing the number of bits in the partial track address).

Techniques other than the above described embodiments may be employed to detect the current servo zone (and/or sub zone) the head is over. For example, in one embodiment each servo zone may comprise a unique servo burst pattern or different type of servo burst that uniquely identifies the servo zone. After detecting the sync mark the current servo zone may be detected by evaluating the following servo bursts in the servo sector. For example, the down-track location and/or the frequency of the servo bursts may be used to identify the servo zone. In another embodiment, at least one servo sector in each servo zone may comprise a dedicated field for recording a servo zone identifier that may be evaluated after detecting the sync mark in the servo sector.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising a plurality of servo sectors defining a plurality of servo tracks, wherein:
the servo tracks form a plurality of servo zones; and
at least one servo sector of a servo track comprises a partial track address;
a head; and
control circuitry configured to:
process a read signal generated by the head to detect a current servo zone for the head;
process the read signal to detect the partial track address in one of the servo sectors of the current servo zone; and
generate a full track address based on the detected servo zone and the detected partial track address.

2. The data storage device as recited in claim 1, wherein:
the partial track address represents a plurality of low order bits of the full track address; and
the detected servo zone represents at least one high order bit of the full track address.

3. The data storage device as recited in claim 1, wherein:
a servo data rate of servo sectors in a first servo zone is different than a servo data rate of servo sectors in a second servo zone; and
the control circuitry is configured to detect the current servo zone for the head based on a detected data rate of the servo sectors.

4. The data storage device as recited in claim 1, wherein:
a first servo sector of a first servo track of a first servo zone comprises a first sync mark;
a second servo sector of a second servo track of the first servo zone comprises a second sync mark different from the first sync mark; and
the control circuitry is configured to detect the current servo zone for the head based on a detected sync mark in the current servo zone.

5. The data storage device as recited in claim 3, wherein:
a first servo sector of a first servo track of a first servo zone comprises a first sync mark;
a second servo sector of a second servo track of the first servo zone comprises a second sync mark different from the first sync mark; and
the control circuitry is configured to:
detect a sync mark in the current servo zone for the head; and
generate the full track address based on the detected servo zone, the detected sync mark, the detected partial track address.

6. The data storage device as recited in claim 5, wherein:
the partial track address represents a plurality of low order bits of the full track address;
the detected sync mark represents at least one middle order bit of the full track address; and
the detected servo zone represents at least one high order bit of the full track address.

7. A method of operating a data storage device, the method comprising:
processing a read signal generated by a head to detect a current servo zone for a head over a disk, the disk comprising servo tracks that form a plurality of servo zones;
processing the read signal to detect a partial track address in at least one of the servo sectors of the current servo zone; and
generating a full track address based on the detected servo zone and the detected partial track address.

8. The method as recited in claim 7, wherein:
the partial track address represents a plurality of low order bits of the full track address; and
the detected servo zone represents at least one high order bit of the full track address.

9. The method as recited in claim 7, wherein:
a servo data rate of servo sectors in a first servo zone is different than a servo data rate of servo sectors in a second servo zone; and
the method further comprises detecting the current servo zone for the head based on a detected data rate of the servo sectors.

10. The method as recited in claim 7, wherein:
a first servo sector of a first servo track of a first servo zone comprises a first sync mark;
a second servo sector of a second servo track of the first servo zone comprises a second sync mark different from the first sync mark; and
the method further comprises detecting the current servo zone for the head based on a detected sync mark in the current servo zone.

11. The method as recited in claim 9, wherein:
a first servo sector of a first servo track of a first servo zone comprises a first sync mark;
a second servo sector of a second servo track of the first servo zone comprises a second sync mark different from the first sync mark; and
the method further comprises:
detecting a sync mark in the current servo zone for the head; and
generating the full track address based on the detected servo zone, the detected sync mark, the detected partial track address.

12. The method as recited in claim 11, wherein:
the partial track address represents a plurality of low order bits of the full track address;
the detected sync mark represents at least one middle order bit of the full track address; and
the detected servo zone represents at least one high order bit of the full track address.

* * * * *